Nov. 15, 1955 — R. A. ALLEN — 2,723,631
SYSTEMS FOR AND METHODS OF STOWING
AND SECURING SHIPS' CARGO

Filed June 14, 1952 — 5 Sheets-Sheet 1

INVENTOR.
RUDOLPH A. ALLEN
BY Reynolds, Beach & Christensen
ATTORNEYS

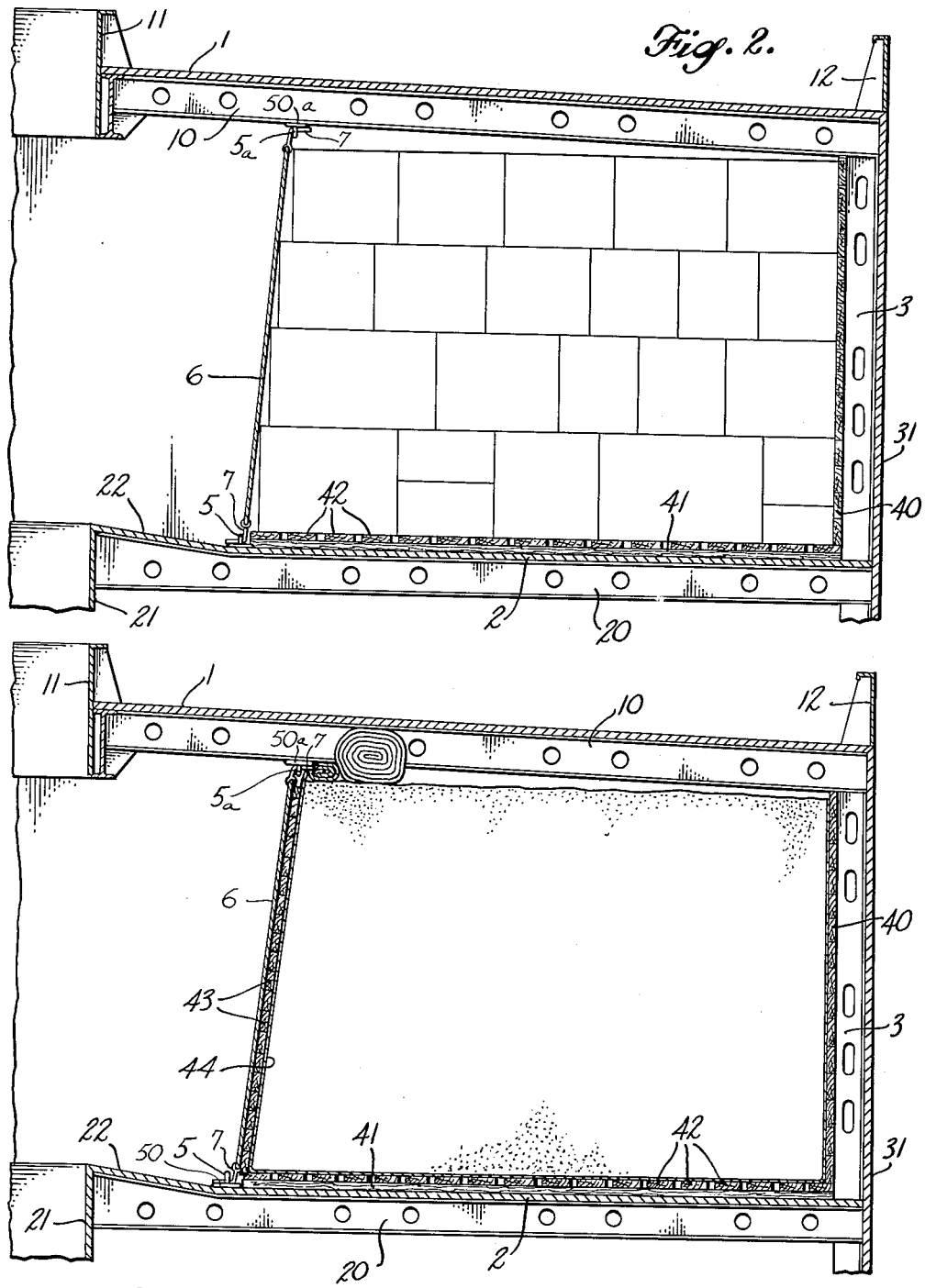

Nov. 15, 1955                    R. A. ALLEN                    2,723,631
                   SYSTEMS FOR AND METHODS OF STOWING
                          AND SECURING SHIPS' CARGO
Filed June 14, 1952                                          5 Sheets-Sheet 3

INVENTOR.
RUDOLPH A. ALLEN
BY
Reynolds, Beach & Christensen
ATTORNEYS

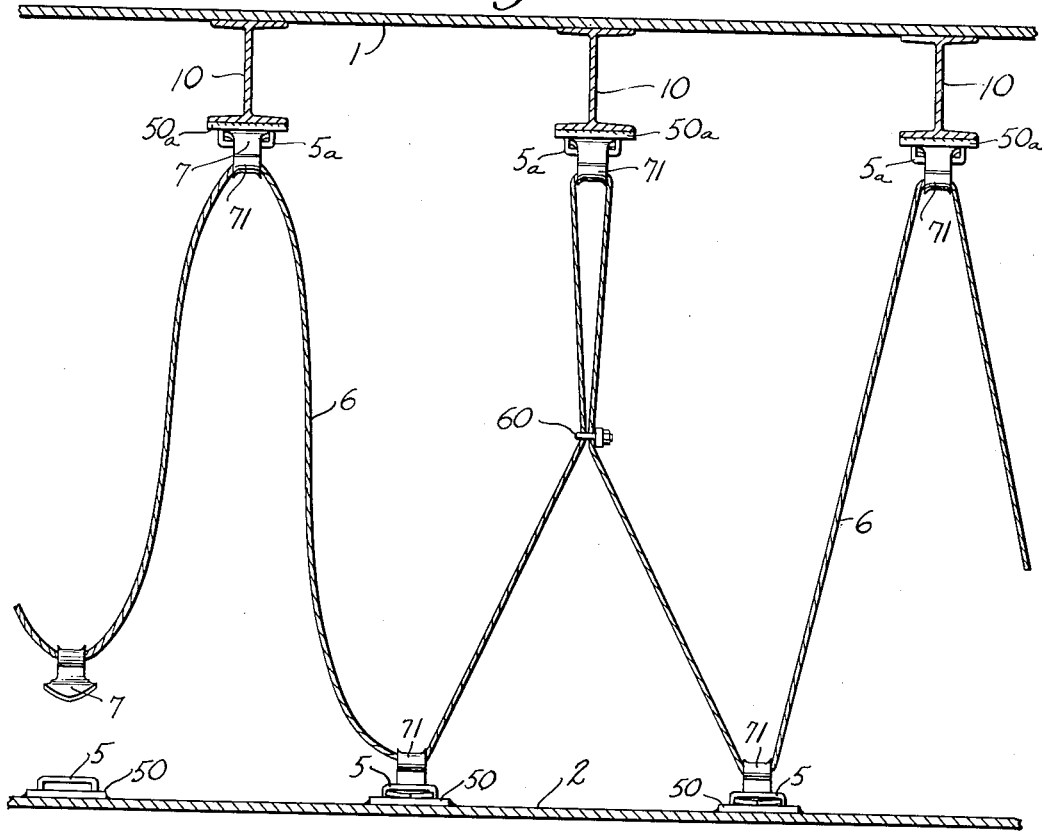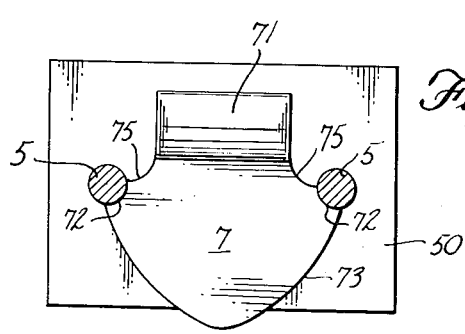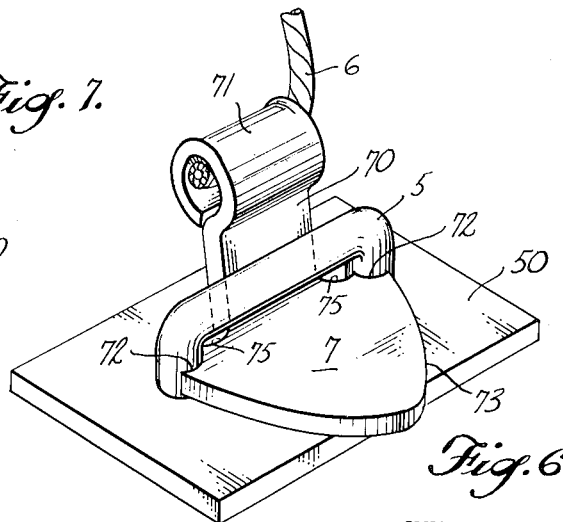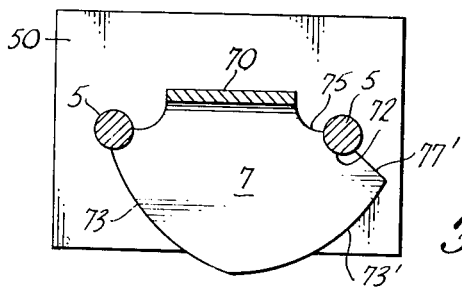

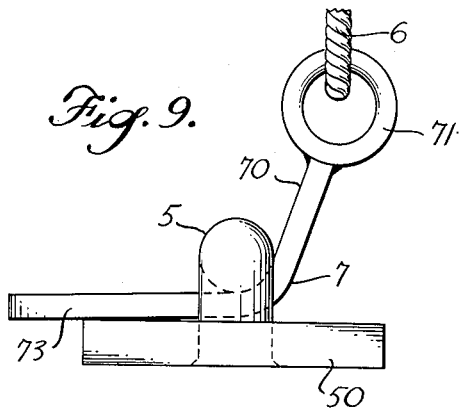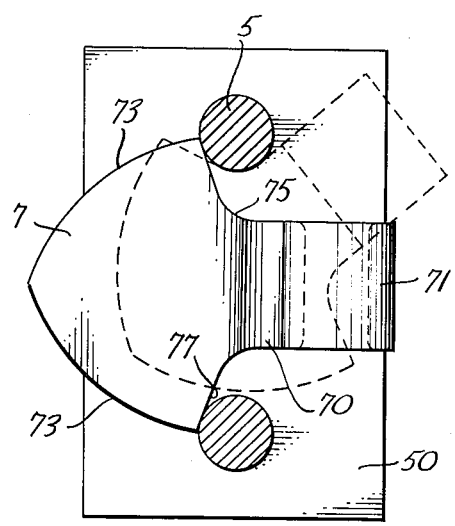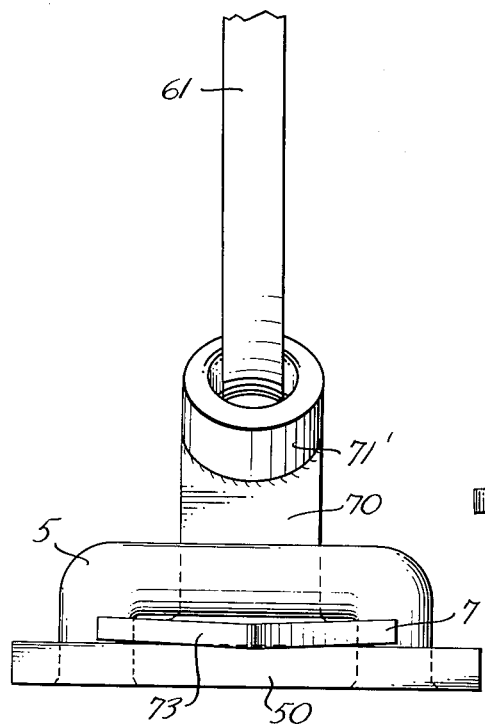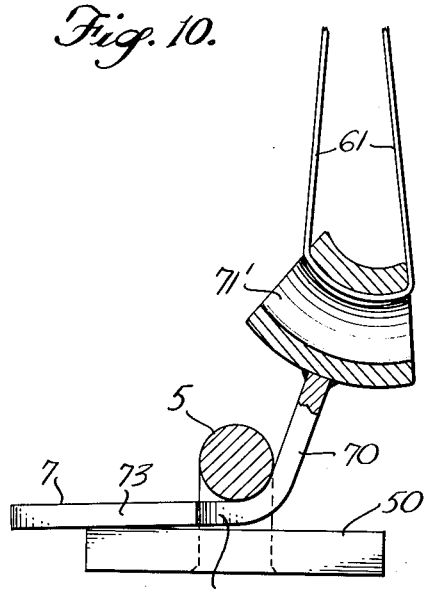

United States Patent Office 2,723,631
Patented Nov. 15, 1955

2,723,631

SYSTEMS FOR AND METHODS OF STOWING AND SECURING SHIPS' CARGO

Rudolph A. Allen, Seattle, Wash.

Application June 14, 1952, Serial No. 293,597

14 Claims. (Cl. 105—369)

The present invention relates primarily to the stowage and securing of cargo in a ship's load.

There are several objectives, sometimes conflicting, to be attained to the highest degree possible in the stowage of cargo on ships. One such objective is to protect the ship and crew from damage or injury, which is usually attained in part by the use of dunnage and shoring in such manner and of such strength that the cargo can not break loose and shift, in the worst weather which the ship may encounter. Another objective is to handle the stowage operation—and conversely, the discharging operation at the proper port—with the maximum possible speed and with minimum use of and destruction of dunnage in order to save time and cost, and to reduce stevedoring costs.

The present invention provides a standardized means, and a method, adaptable to substantially all cargo spaces and all types of cargo, whereby the stowage of cargo and its securement, and conversely its discharge, can be accomplished easily and quickly, and with minimum usage of dunnage, and with maximum reuse thereof, hence relatively inexpensively, yet as securely, or more so, than with the systems now so widely used. Thereby the two objectives mentioned above, and all other necessary and usual objectives, are attained, and in the larger sense the ship's cost of operation is materially reduced and its safety is made more sure.

According to the present invention special pad eyes are installed at proper intervals, alignment, and locations on a lower deck, and at corresponding intervals, alignment, and locations beneath the deck above, and after the cargo is stowed in the usual or normal manner in the cargo space, flexible cargo retaining means, such as a line reeved through the eyes of successive special hooks, and engageable thus with the installed pad eyes, one above and one below, is drawn taut against the cargo, and secured at frequent intervals, one run to another, and of course, its ends. Thereby the use of much of the dunnage formerly required, and especially all the heavy timbers and shoring, is eliminated, all as will appear more fully hereinafter.

The system is flexible, and enables the proper stowage of cargo varying widely in type—as dry bulk cargo, bags, bales, barrels, boxes, rolls, etc.—or in size of the individual shipment, with a minimum of labor and of dunnage; cargo lots can be adequately segregated, and the efficient utilization of all cargo space is facilitated. All elements of the cargo-securing means are reusable indefinitely.

The invention comprises the novel means for stowing and securing cargo, the novel method of so doing, and the pad eyes and the lines with their special hooks, which collectively are the key devices utilized in carrying out the means and method of stowing and securing the cargo, and which are illustrated in several forms or shapes.

In the accompanying drawings the invention is shown installed and in use in a typical 'tween-deck hold, and the principles which constitute my invention will be explained hereinafter.

Figure 1 is a view in the nature of a perspective looking down into a 'tween-deck wing of a ship, but with part of the upper deck broken away, illustrating the manner of stowing and securing one type of cargo according to the present invention, and illustrating the usage of a wheeled truck or vehicle in the handling of cargo. It is not intended to illustrate the proper sequence of operations, but instead represents in one view several successive stages of such an operation.

Figure 2 is a transverse sectional view through the wing of a 'tween-deck space on such a ship, showing a different type of cargo stowed and secured therein according to the present invention, and Figure 3 is a view similar to Figure 2 showing the securement and stowage of a different type of cargo, such as bulk wheat, in a similar space.

Figure 5 is an elevational view of a length of the securing line, showing it in process of engagement with a pad eye, engaged but not drawn taut, and finally, drawn taut.

Figure 6 is an isometric view of a special hook, operatively engaged with a pad eye, in the preferred form.

Figure 7 is a transverse sectional view through the shank of such a special hook and through the eye with which it is engaged, illustrating the preferred form, and Figure 8 is a similar view illustrating a modified form.

Figure 9 is a side elevational view of a hook, illustrating how an upward pull tends to cramp it more tightly in place.

Figure 10 is a plan view of a simplified form of hook, with the cooperating eye in section, illustrating how such a hook centers and holds itself in engaged position, and how it can be engaged and disengaged.

Figure 11 is a view partly in section and partly in side elevation, and Figure 12 is a front elevational view, of a differently modified form of a hook, engaged with a pad-eye.

Figure 1:
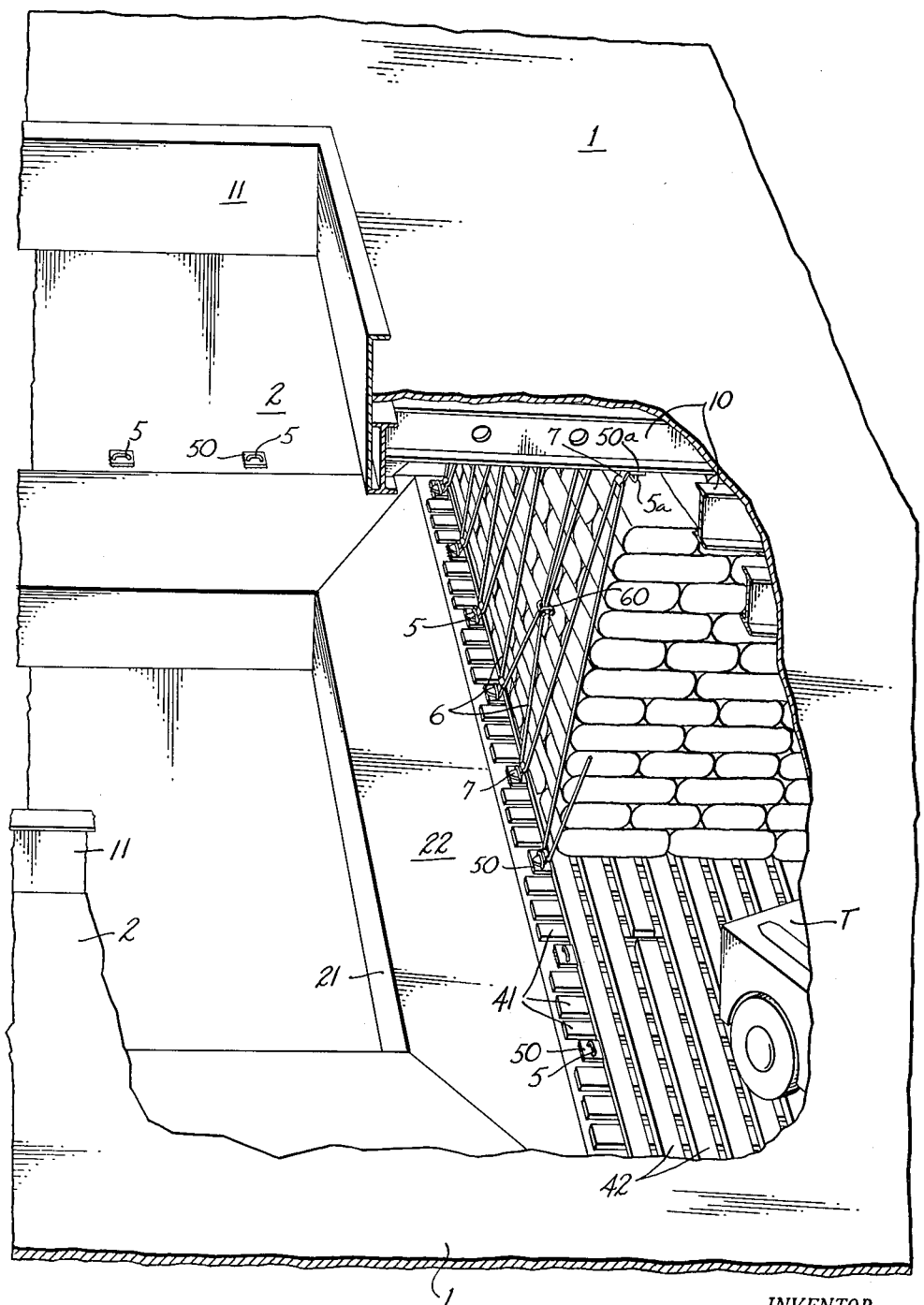
Figure 4:
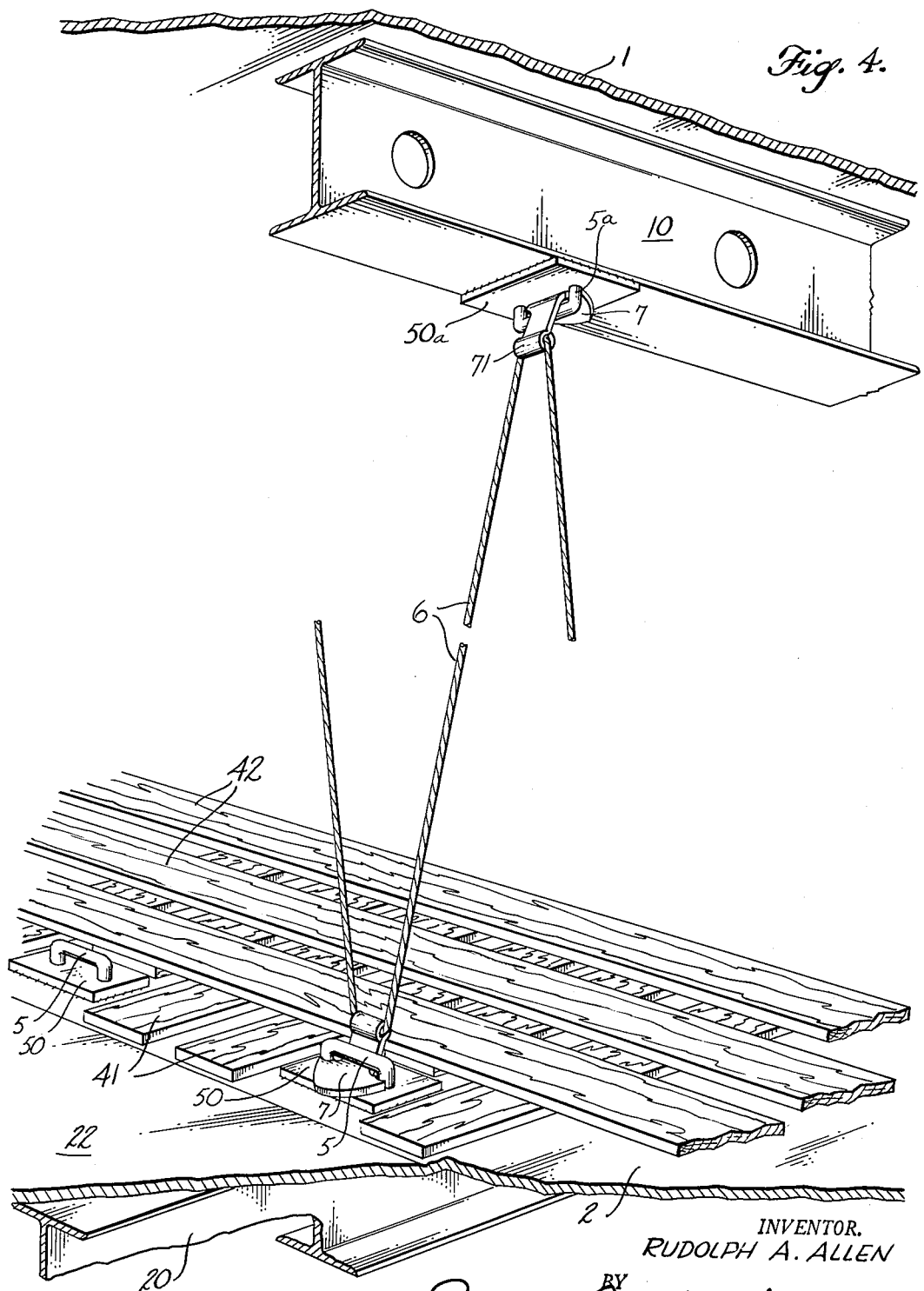
Figure 4 is a view in the nature of a perspective taken from within the 'tween-deck space, and showing a short length of the securing line, and its relationship to the structural parts of the ship and to the layers of dunnage laid on the lower deck.

The ship illustrated in the accompanying drawings is intended to be representative or typical of various cargo ship constructions, and since the invention is adaptable to various types of construction, it is not to be understood that the construction of the vessel per se is a necessary part of this invention, and that shown is merely typical. To explain, however, an upper deck is indicated at 1, including the thwartship deck beams 10, and the hatch admitting to the 'tween-deck space is framed by the coaming 11. The rail is indicated at 12. A lower deck is indicated at 2, including its thwartship beams 20, and the hatch coaming 21, with the brow 22 sloping upwardly to the upper edge of the hatch coaming 21 from the level of the deck at 2, the brow rising normally from a point approximately three feet inwardly from the hatch, this space being required by maritime usage, agreements, or law, so that there may be a walkway for stevedores and for crew members around the square of the hatch. To complete the description, a rib is illustrated at 3, and the outer skin at 31. While the description and showing represents an upper deck at 1 and a second or lower deck at 2, these might be respectively a lower deck and a third deck, etc., for the invention is applicable to all holds and to all cargo space, and is especially well adapted to 'tween-deck space.

Since the stowage of cargo in the wings of a 'tween-deck space is a particularly troublesome problem, the invention has been shown in the drawings as applied to the solution of that problem in that particular part of the cargo space. Since one of the objects is to lessen the various types of dunnage and to concentrate virtually exclusively on a single size and style of dunnage plank, the deck 2 is covered with dunnage planks of a given size, laid in the usual manner in two layers, crossing one another, as indicated at 41 and 42. These dunnage planks need not extend inboard beyond the outboard edge of the brow 22, and when all are laid and all are of the same size, these dunnage planks, each of a thickness approximating half the height of pad-eyes described hereinafter, will rise to a level such that the pad-eyes do not project above the dunnage. In addition, dunnage, in the form of battens, as indicated at 40, may be laid against the ribs 3. The upright dunnaging last mentioned may proceed as the stowage of the cargo proceeds.

Cargo of whatever nature is now stowed in the normal manner upon the planks 41 and 42, and against the battens 40, but outboard of the inboard cargo limit line represented by the lower edge of the brow 22. Bagged cargo has been illustrated in Figure 1, miscellaneous boxes in Figure 2, and in Figure 3, bulk cargo is shown, held by dunnage planks 43 and matting, tarpaulin, etc. indicated at 44. The cargo in bags, rolls, boxes, or similar pieces, can well be handled by a wheeled vehicle or truck indicated at T in Figure 1, which may be power-driven or merely a hand truck.

The present invention requires that previously there will have been secured to the deck 2 a plurality of pad eyes. These pad-eyes each consist of an elongated pad or plate 50, and eye formed by an elongated generally straight bar 5 parallel to and spaced but slightly above the plate 50, and permanently secured at its down turned ends to the plate, by welding, riveting, etc. These pad eyes are secured preferably permanently, as by welding their plates to the deck, and generally in alignment at spaced intervals along the cargo limit line (and elsewhere as needed). Some departure from exact alignment, or alignment along other than a straight line, may be required by local conditions. Their spacing need not be exact nor uniform, but since in a typical vessel the deck beams 10 and 20 are located at 30-inch spacings, and since it is desirable to mount these pad eyes as directly as possible upon the deck beams, it is preferred that the pad eyes be welded to the deck immediately over each such beam, at 30-inch spacings.

A second series of similar pad eyes, represented at 50a and 5a, is secured to the beams 10 of the upper deck at spacings of the lower pad eyes 5, 50, and in similar but often staggered alignment, and preferably located somewhat more greatly outboard. Thus each lower pad eye has a corresponding upper pad eye, and both the paired pad eyes are secured as directly as possible to the substantial deck beams, and transfer their loads most directly thereto.

With reference to the individual pad eyes, it will be noted that its overall height is sufficiently slight that the lower pad eye does not project substantially, if at all, above the level of the upper surface of the dunnage planks 42, but rather lies at the same level. Because the pad eyes do not extend above the level of the dunnage laid on the deck, the wheeled vehicle as represented at T is not in any sense impeded by the presence of the pad eyes on deck and permanently fastened there. Moreover, the dunnage planks readily avoid the pad eyes without any special provision for such avoidance.

Now, the cargo having been stowed in proper or normal manner, a line, cable or other flexible member is strung between the paired upper and lower pad eyes 5 and 5a, and is drawn taut. It is possible to employ individual lines between each two paired pad eyes, independently of all other such lines, and metal strapping with its usual constrictive securing means has been used for the purpose, as illustrated in Figures 11 and 12. At best, such metal strapping is not as strong as, for example, a 5/8" wire cable, but it has the advantage that, being flat, it can be reeved directly through the flattened pad eyes whereas a 5/8" line can not. However, I have devised means whereby such a line can be engaged securely with and disengaged at will from the flattened pad eyes, and that arrangement, which I shall now describe, is preferred.

A suitable line 6, of adequate length, is reeved through the eyes 71 of successive special hooks generally designated 7. These hooks are formed of flat metal plate, blade-like and somewhat spear-pointed at one end. The shank 70 extends upwardly at approximately (preferably somewhat less than) a right angle to the spear-shaped point or blade, and terminates at the upper end in a running eye 71, through which the line 6 runs. The shank is of a breadth somewhat less than the inside width of the pad eye 5, and the spear-shaped point spreads outwardly at both sides (equally, as in Figure 7, or unequally, as in Figure 8) to a breadth in excess of the width of the pad eye 5, and then curves inwardly at 73, about a center 75 in the vicinity of the juncture of the shank with the edge 72. In Figures 6, 7 and 8 the shoulders of the spear-shaped blade are each formed with a notched seat 72 located to receive the respective vertical portions of the pad eye 5 when the engaged hook is centered in holding position. This makes accidental disengagement difficult. In Figure 10 the blade has sloped shoulders 77, and these serve to effect self-centering of the blade when pulled rearwardly, and accidental disengagement of this form is unlikely.

Each such special hook is inserted edgewise between the eye 5 and its pad 50 by a rotative motion (see Figure 10) centered at the juncture of the edge 72 and the shank 70, at 75. Once entered, the slope of the two edges 77 (in Figure 10) centers the point, and by their engagement with the vertical shanks of the eye they preclude accidental disengagement, particularly when the line 6 is drawn taut and strain thereon pulls the special hook 7 outwardly, tending to withdraw it and pressing its point hard against the pad's upper surface. In the form of Figures 6, 7 and 8 the seating of the notches 72 in a manner to embrace the vertical shanks of the eye not only centers the hook but prevents its sidewise shifting accidentally towards disengaging position.

In the alternative form shown in Figure 8 the point of the special hook is one-sided. The edge 73 is still centered at point 75, as before, but the edge 77' is materially elongated, and if the edge 73' were centered in the same manner as edge 73, the hook's point can only be inserted or withdrawn by pivotal motion about the single point 75.

It is preferred that the hooks be directed alternately one way and then the opposite way, as they are reeved upon the line. When they are to be installed to secure cargo, the terminal hook is engaged with a pad eye, say the lower pad eye 5, the next hook is engaged with the paired upper pad eye 5', the next hook with the next lower pad eye 5, and so on, until the cargo has in effect been laced in with the several vertical runs of the line. Now the line is drawn taut. It is preferred that this be done by drawing together at occasional intervals two adjacent upright runs, and securing them with a cable clamp 60, as shown for example in Figure 5. This provides a secure barrier of spaced more or less vertical lines against shifting of the cargo, against which it bears. The spacing is governed principally by the spacing between pad eyes. If this spacing is considered too great in relation to the particular cargo, then dunnage planks may readily be inserted, as in Figure 3, before the line 6 is drawn taut against the cargo. Alternatively, fences of dunnage may be constructed on deck or on the dock, where working space is more open, and then lowered into the hold, to be held by the lines when drawn taut.

It will be noted (see Figure 9) that an upward pull on the line 6 reacts to rotate the hook 7 as a whole about the horizontal portion of the eye 5. The eye has a clear opening but slightly greater than the thickness of the blade, and this rotational effect urges the outer or tip end of the blade downwardly against the plate 50 of the pad eye. This cramps the two together, and further assists in preventing accidental disengagement, for the harder the cargo strains against the cables, the tighter the blade is cramped against the plate.

When the cargo is to be discharged, the cable clamps 60 are removed or the line 6 is otherwise slacked off, and now the hooks 7, which have been held tightly by the line's tension, can be rotated and so disengaged from their pad eyes. The line is available for use over and over again, for there is little likelihood of its being over-stressed, nor of the hooks 7 being harmed in use, unless perhaps the line may be chafed.

In Figures 11 and 12 the hook's eye 71' is set at 90° to the plane of the shank 70. While such hooks will receive cable, as already described, they are well-adapted to receive metal strapping 61. Such strapping may run between each upper and lower pair of pad eyes 5 and 5', or may run continuously to a number of successive upper and lower pad eyes. The eye 71' is shown here as welded to the shank 70, as is the case in Figure 9, but whether so formed or formed integrally and bent round, as in Figure 6, is an immaterial engineering detail.

The pad eyes can be located elsewhere than at the inboard limit of the cargo space, or in additional locations, as for instance, nearer the bilge to divide the wing into more than the one cargo space thwartships. When installed transversely ahead or aft of the hatch, it is obvious that the pad eyes would be oriented thwartships, and that they would be secured, as far as is practicable, to separate fore-and-aft framing elements.

By the use of this means and method of stowing and securing cargo, the initial cost of dunnage is greatly reduced; its reuse is simplified; little or no shoring is required, thereby eliminating the cost of the materials used in shoring, and greatly lessening the labor cost of securing the cargo; and all cargo is safely, tightly and evenly stowed and secured. Manpower is saved in the stowage and discharge of the cargo, not only because of the lessening of the labor of dunnaging, but because, also, it is possible to make efficient use of powered vehicles or other wheeled trucks, and such dunnage as is used may be used over and over again, as may also the lines and hooks. These lines may be short lengths of used cable, but in any event are a standard, commercially available product of wholly adequate strength. While the cable 6 is of relatively large thickness, too great to reeve through the pad eyes, the flat special hooks may be readily engaged with and disengaged from a pad eye which rises but a minimum distance or spacing from the upper surface of the plate, so long as the line is slack, but is securely held fast when the line is taut.

It will be evident that although such a system and method of securing cargo will find its greatest usefulness within holds or cargo spaces, nevertheless such pad eyes may be secured on upper decks and utilized in conjunction with lines and special hooks to secure deckloads.

In a heavy sea, since all parts of the line 6 are under even stress or strain, no accumulation of strain is likely to be built up on any one run of the several runs of the line, and it has been found in actual use that this system of securing cargo is stronger and safer than the shoring methods heretofore in general use.

I claim as my invention:

1. A method of securing cargo in the hold of a ship when stowed upon a lower deck or upon dunnage planks laid thereupon, to which lower deck a row of spaced pad-eyes have been permanently secured in alignment, with corresponding and similar pad-eyes located and similarly aligned above the lower line and secured to and beneath the upper deck, which method comprises joining the several upper and lower pad-eyes with a single continuous flexible cable arranged in upright runs, and tightening the several such runs of the cable, so installed, to draw it taut as a whole.

2. Means for securing cargo in the hold of a ship between an upper and a lower deck, upon such lower deck or upon dunnage laid thereupon, which securing means comprises a plurality of pad-eyes secured to the lower deck, spaced from and generally in alignment with one another, and each of a height not substantially greater than the height of normal dunnage laid on such deck, a similar number of pad-eyes secured to and beneath the upper deck, in the same general alignment as the first-mentioned pad-eyes, and a continuous length of flexible line joining successive paired upper and lower pad-eyes and drawn taut as a whole.

3. Means for securing cargo in the hold of a ship between an upper and a lower deck, upon dunnage laid upon such lower deck, which securing means comprises a plurality of pad-eyes secured to the lower deck, spaced along the limit-line for cargo, and each of a height not substantially greater than the height of normal dunnage laid on such deck, a similar number of pad-eyes secured to and beneath the upper deck, in the same general alignment and locations as the first-mentioned pad-eyes, a continuous length of flexible line joining successively and alternately the several corresponding upper and lower pad-eyes and held taut therebetween.

4. Means for securing cargo as set forth in claim 3, including a plurality of hook devices, one for each pad-eye, reeved upon the line, and formed for engagement with each such pad-eye, and for retention thereby so long as the line is taut.

5. Means for securing cargo of the nature and for use in the manner set forth in claim 3, including means joining and drawing together selected adjacent runs of the line, whereby to draw the line taut as a whole.

6. Means for securing cargo of the nature and for use in the manner set forth in claim 3, including a plurality of cable clamps joining and drawing together a number of adjacent runs of the line, whereby to tighten the line as a whole.

7. Means for securing cargo in the hold of a ship between an upper and a lower deck, which securing means comprises a plurality of pad-eyes secured to the lower deck, spaced from and generally in alignment with one another, a similar number of pad-eyes secured to and beneath the upper deck, in the same general alignment as the first mentioned pad-eyes, a continuous length of flexible line joining successive paired upper and lower pad-eyes, and a plurality of hook devices, one for each pad-eye, each hook device including a running eye through which the line is reeved to retain the hook device, a shank extending from said running eye, and of a width at its end distant from said running eye slightly less than the breadth of said pad-eye, and a flat point directed angularly from said shank's end, having two edges diverging from the opposite edges of the shank, and two converging edges, at least one whereof is curved about a center at the juncture of the opposite diverging edge with the shank.

8. Means for securing cargo of the nature and for use in the manner set forth in claim 7, wherein the divergent edges of each hook device are each formed with seats spaced to receive the vertical shanks of the corresponding pad-eye, and thereby to be retained in centered position.

9. A cargo-securing device for use with flat pad-eyes having a broad, shallow aperture, comprising a line, and a series of hook devices threaded thereon, each hook device comprising a flat point thin enough to enter the pad-eye's aperture, a shank of a breadth somewhat less than the pad-eye's breadth, directed angularly away from said point, means at the opposite end of the shank for receiving and running along the line, and the point being broadened immediately outwardly of the shank, but formed in a shape to slip rotatively edgewise into the pad-eye's aperture.

10. A cargo-securing device as in claim 9, wherein the point is formed with two equal, divergently sloped edges joined to the shank, and two like curved convergent edges each centered at the juncture of the shank with the opposite divergent edge.

11. A cargo-securing device as in claim 9, wherein the point is formed with two unequal, divergently sloped edges joined to the respectively opposite edges of the shank, and two unlike curved, convergent edges, one whereof is centered at the juncture of the shank with the opposite, and longer, of the divergent edges.

12. A hook for securement of a line to a flat pad-eye, comprising a shank formed at one end with a line-receiving eye, a rigidly-connected blade-like point directed angularly from the opposite end of the shank, said point having edges diverging from the shank and outermost converging edges, at least one such converging edge being curved about a center located at the junction between the shank and the opposite diverging edge.

13. A hook as defined in claim 12, characterized in that the divergent edges are formed with notches spaced apart equivalent to the spacing between vertical shanks of the pad-eye.

14. A hook as defined in claim 12, characterized in that the divergent edges are sloped outwardly and towards the pointer end of the blade-like point, to bear against and to center the hook with respect to the two vertical shanks of the pad-eye.

References Cited in the file of this patent

UNITED STATES PATENTS

| | | |
|---|---|---|
| 1,651,081 | Bardon | Nov. 29, 1927 |
| 2,361,081 | Brandon | Oct. 24, 1944 |
| 2,490,434 | Harris | Dec. 6, 1949 |
| 2,577,504 | Barber | Dec. 4, 1951 |
| 2,608,730 | Killius | Sept. 2, 1951 |

FOREIGN PATENTS

| | | |
|---|---|---|
| 584,314 | France | Nov. 17, 1944 |